United States Patent
Han et al.

(10) Patent No.: US 9,057,365 B2
(45) Date of Patent: Jun. 16, 2015

(54) BUSH BEARING FABRICATING METHOD THEREOF AND HERMETIC COMPRESSOR HAVING THE SAME

(75) Inventors: Jeongmin Han, Changwon (KR); Hongseok Seo, Changwon (KR); Jaechan An, Changwon (KR); Keunju Lee, Changwon (KR); Jeonghun Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 817 days.

(21) Appl. No.: 13/149,255

(22) Filed: May 31, 2011

(65) Prior Publication Data
US 2012/0020819 A1    Jan. 26, 2012

(30) Foreign Application Priority Data

Jul. 23, 2010   (KR) .................... 10-2010-0071627

(51) Int. Cl.
F04B 39/00     (2006.01)
F04B 39/12     (2006.01)
F16C 9/02      (2006.01)
F16C 33/20     (2006.01)

(52) U.S. Cl.
CPC ......... *F04B 39/0094* (2013.01); *F04C 2240/56* (2013.01); *F04B 39/121* (2013.01); *F16C 2223/32* (2013.01); *F16C 9/02* (2013.01); *F16C 33/208* (2013.01); *F16C 2208/32* (2013.01)

(58) Field of Classification Search
CPC ............... F04C 23/008; F04C 2240/50; Y10S 417/902; F16C 33/208
USPC .......... 417/410.1, 902; 384/160, 213; 29/898, 29/898.04, 898.06, 898.061, 898.13, 29/898.15
See application file for complete search history.

(56) References Cited

U.S. PATENT DOCUMENTS 7,179,061 B2 *   2/2007   Horton et al. ................. 417/220
2009/0052822 A1 *   2/2009   Hardgrave et al. ........... 384/300

FOREIGN PATENT DOCUMENTS

| CN | 2482605 | 3/2002 |
| CN | 2589733 | 12/2003 |
| CN | 1548755 | 11/2004 |
| CN | 1896528 | 1/2007 |
| WO | WO 2008/062789 | 5/2008 |

OTHER PUBLICATIONS

Chinese Office Action for Application No. 201110187907.X, dated May 30, 2013 (Full Chinese Text with English Translation).

* cited by examiner

*Primary Examiner* — Devon Kramer
*Assistant Examiner* — Patrick Hamo
(74) *Attorney, Agent, or Firm* — KED & Associates LLP (57) ABSTRACT

Disclosed are a bush bearing, a fabricating method thereof and a hermetic compressor having the same. A lubricant member of the bush bearing can be adhered onto a housing or press-fitted therein so as to remarkably increase the thickness of the lubricant member, whereby the bush bearing can be more resistant to abrasion, and upon applying the same to the compressor, abrasion of a crank shaft or the bush bearing can be reduced.

12 Claims, 10 Drawing Sheets

BUSH BEARING FABRICATING METHOD THEREOF AND HERMETIC COMPRESSOR HAVING THE SAME

CROSS-REFERENCE TO RELATED APPLICATION

Pursuant to 35 U.S.C. §119(a), this application claims the benefit of earlier filing date and right of priority to Korean Application No. 10-2010-0071627, filed on Jul. 23, 2010, the contents of which is incorporated by reference herein in its entirety.

BACKGROUND OF THE INVENTION

1. Field of the Invention

This specification relates to a bush bearing used as a journal bearing and a hermetic compressor having the same.

2. Background of the Invention

In general, a hermetic compressor includes a motor for generating a driving force in an inner space of a hermetic case, and a compression part coupled to the motor for compressing a refrigerant. The hermetic compressors may be divided into a reciprocal type, a scroll type, a rotary type, a vibration type and the like according to a refrigerant compression mechanism. The reciprocal type, the scroll type and the rotary type use a rotational force of the motor, while the vibration type uses a reciprocal motion of the motor part.

Among those hermetic compressors, the motor of the hermetic compressor using the rotational force has a crank shaft to transfer the rotational force of the motor to the compression part. For example, the motor of the rotary type hermetic compressor (hereinafter, referred to as a rotary compressor) includes a stator fixed to the hermetic case, a rotor inserted in the stator with a predetermined gap therebetween to be rotatable by interaction with the stator, and a crank shaft coupled to the rotor to transfer the rotational force of the rotor to the compression part.

The compression part includes a cylinder, a rolling piston and a vane for compressing a refrigerant in the cylinder, and a plurality of bearing members for defining a compression space together with the cylinder and supporting the crank shaft. The bearing members are typically located at one side of the motor to support the crank shaft. However, as compressors becomes highly efficient in recent time, a technology of minimizing compressor vibration by installing bearings at both upper and lower ends of the crank shaft has been introduced.

When the bearings are installed at the upper and lower ends of the crank shaft, the upper bearing may generally be implemented as a ball bearing or a bush bearing. Especially, the bush bearing may be made of bimetal, resin (polytetrafluoroethylene (PTFE), typically Teflon), carbon, a solid material and the like. Among others, bimetal, resin and carbon are generally used for a compressor, and the resin-based bush bearing is used the most widely. A bush bearing made of bimetal or carbon is highly resistant to abrasion, and a bush bearing made of resin is excellent in view of a frictional loss due to a low frictional coefficient of the resin.

However, in the configuration of the related art Teflon-based bush bearing, since the Teflon having lubricity is pressed-fitted between porous bronze sintered layers, the Teflon layer is actually formed with a thickness of approximately 20 μm, which is merely as thin as about 20% of the overall thickness of the bush bearing. Consequently, if a friction is generated between an outer circumferential surface of the crank shaft and an inner circumferential surface of the bush bearing, the Teflon layer of the bush bearing may be fast worn away and thereby the metallic bronze sintered layer may come in contact with the crank shaft, resulting in a drastic abrasion of the bush bearing or the crank shaft.

SUMMARY OF THE INVENTION

Therefore, an aspect of the detailed description is to provide a bush bearing, capable of reducing a frictional loss by way of increasing a thickness of a Teflon layer without increase in the thickness of the bush bearing, in a Teflon-based bush bearing, a fabrication method thereof, and a hermetic compressor having the same.

To achieve these and other advantages and in accordance with the purpose of this specification, as embodied and broadly described herein, a bush bearing including a housing, a lubricant member fixed to an inner circumferential surface of the housing and having a bearing surface such that a rotating element is inserted therein, wherein the lubricant member is made of a resin based type.

In another aspect, there is provided a bush bearing including a housing, a lubricant member fixed to an inner circumferential surface of the housing and having a bearing surface such that a rotating element is inserted therein, and an adhesive member interposed between the housing and the lubricant member and configured to allow adhesion of the lubricant member onto the housing.

In one aspect, there is provided a method for fabricating a bush bearing including coating an adhesive on a steel sheet having a plate shape, coating a resin material having a plate shape on the adhesive, melting the adhesive at high temperature and high pressure such that the resin material is adhered onto the steel sheet, and rolling the resin material-adhered steel sheet and cutting the same or cutting the resin material-adhered steel sheet and rolling the same.

In one aspect, there is provided a hermetic compressor including a hermetic case, a stator fixed to an inner space of the hermetic case, a rotor rotatably disposed with respect to the stator, a crank shaft coupled to the rotor, a compression part coupled to the crank shaft to compress a refrigerant, a first bearing coupled to the compression part to support a first portion of the crank shaft, and a second bearing fixed to the hermetic case to support a second portion of the crank shaft, wherein the second bearing includes a bush bearing, wherein the bush bearing includes a housing, and a lubricant member fixed to an inner circumferential surface of the housing and slidably inserted in the second portion of the crank shaft, the lubricant member being more flexible than a material of the crank shaft.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a bush bearing, and a hermetic compressor according to the exemplary embodiments, with reference to the accompanying drawings. For the sake of brief description with reference to the drawings, the same or equivalent components will be provided with the same reference numbers, and description thereof will not be repeated.

Figure 1:
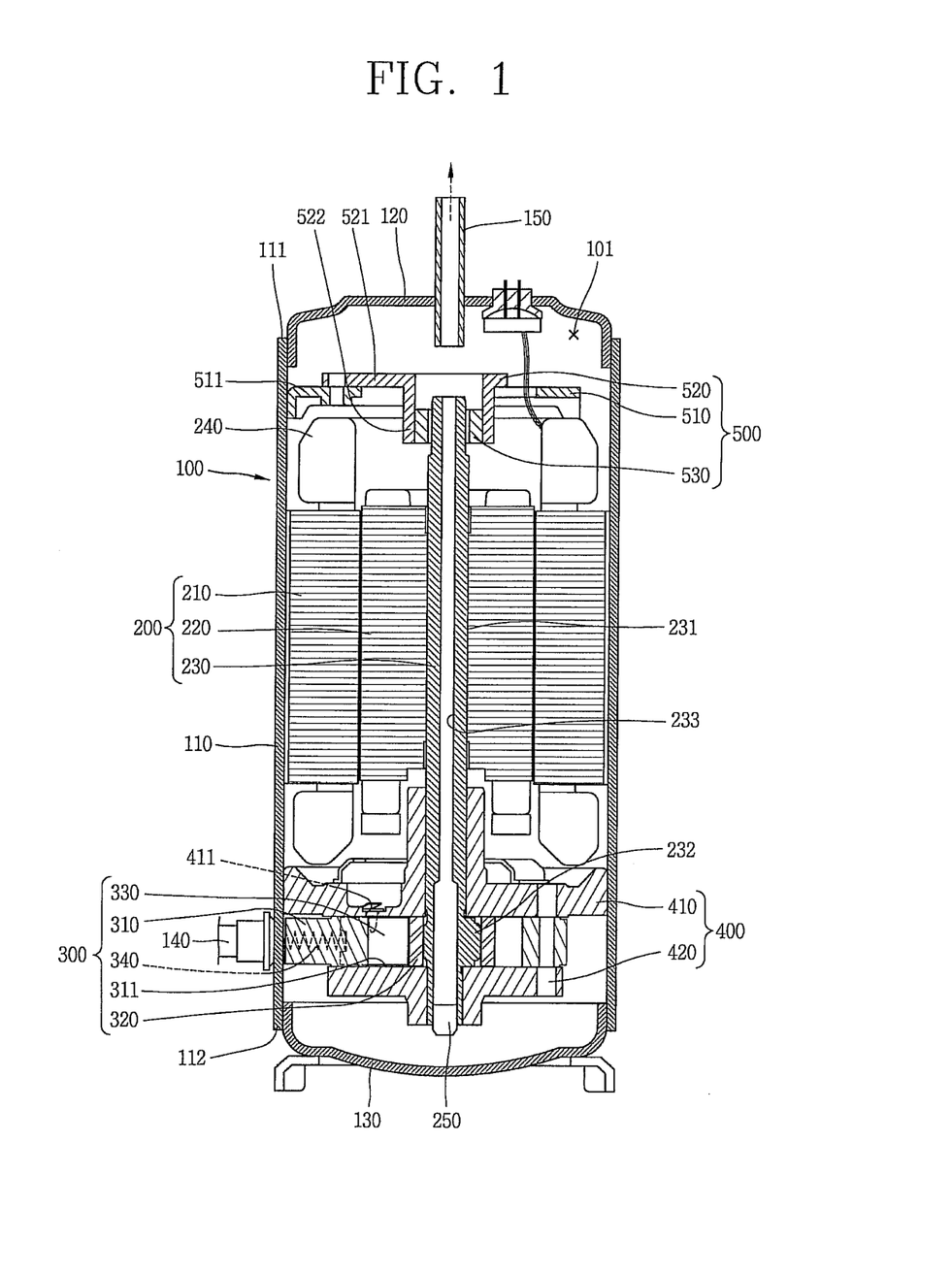
FIG. 1 is a longitudinal sectional view showing an inner structure of a rotary compressor in accordance with an exemplary embodiment.

As shown in FIG. 1, a rotary compressor may include may include a motor 200 located at an upper side of an inner space 101 of a hermetic case 100 for generating a driving force, a compression part 300 located at a lower side of the inner space 101 of the hermetic case 100 for compressing a refrigerant using the driving force generated from the motor 200, and a first bearing 400 and a second bearing 500 installed at lower and upper sides of the motor 200 for supporting a first portion and a second portion of a crank shaft 230, respectively, which will be explained later.

The hermetic case 100 may include a case main body 110 having the motor 200 and the compression part 300 installed therein, an upper cap (hereinafter, referred to as a first cap) 120 for covering an upper open end (hereinafter, referred to as a first opening) 111 of the case main body 110, and a lower cap (hereinafter, referred to as a second cap) 130 for covering a lower open end (hereinafter, referred to as a second open end) 112 of the case main body 110.

The case main body 110 may have a cylindrical shape. A suction pipe 140 may be penetratingly coupled to a principal surface of a lower side of the case main body 110. The suction pipe 140 may be directly connected to an inlet (not shown) located at a cylinder 310, which will be explained later.

An edge of the first cap 120 may be bent to be welded to the first opening 111 of the case main body 110. A discharge pipe 150 for guiding a refrigerant discharged from the compression part 300 into the inner space 101 of the hermetic case 100 to a refrigeration cycle may be penetratingly coupled to the center of the first cap 120.

A edge of the second cap 130 may be bent to be welded to the second opening 112 of the case main body 110.

The motor 200 may include a stator 210 shrink-fitted to an inner circumferential surface of the hermetic case 100, a rotor 220 disposed inside the stator 210 to be rotatable with respect to the stator 210, and a crank shaft 230 shrink-fitted to the rotor 220 and thusly rotating together with the rotor 220 so as to transfer a rotational force of the motor 200 to the compression part 300.

The stator 210 may be formed by laminating a plurality of stator sheets by a predetermined height, and teeth disposed along its inner circumferential surface may be wound with a coil 240.

The rotor 220 may be located at the inner circumferential surface of the stator 210 with a predetermined gap therebetween, and the crank shaft 230 may be shrink-fitted in the center of the rotor 220 to be integrally coupled to the rotor 220.

The crank shaft 230 may include a shaft portion 231 coupled to the rotor 220, and an eccentric portion 232 eccentrically formed at a lower end of the shaft portion 231 and coupled with a rolling piston 320, which will be explained later. The shaft portion 231 may include a first portion (reference numeral not given) formed at a lower side of the eccentric portion 232 to be supported by the first bearing 400, and a second portion (reference numeral not given) formed at an upper side of the eccentric portion 232 to be supported by the second bearing 500. An oil passage 233, through which oil within the hermetic case 100 is sucked up, may be formed through the crank shaft 230 in an axial direction.

The compression part 300 may include a cylinder 310 installed in the hermetic case 100, a rolling piston 320 rotatably coupled to the eccentric portion 232 of the crank shaft 230 for compressing a refrigerant with orbiting in a compression space of the cylinder 310, a vane 330 movably coupled to the cylinder 310 in a radial direction such that a sealing surface of one side thereof contacts an outer circumferential surface of the rolling piston 320 to partition the compression space of the cylinder 310 into a suction chamber and a discharge chamber, and a vane spring 340 implemented as a compression spring for elastically supporting the rear side of the vane 330.

The cylinder 310 may have an annular shape. An inlet (not shown) connected to the suction pipe 140 may be formed at one side of the cylinder 310, and a vane slot 311, into which the vane 330 is slid, may be formed at one side of the inlet in a circumferential direction. A discharge guiding groove (not shown), which communicates with an outlet 411 located at an upper bearing 410 to be explained later, may be formed at one side of the vane slot 311 in a circumferential direction.

The first bearing 400 may include an upper bearing 410 for cover the upper side of the cylinder 310 and simultaneously supporting the crank shaft 230 in an axial direction and a radial direction by being welded to the hermetic case 100, and a lower bearing 420 for covering the lower side of the cylinder 310 to support the crank shaft 230 in the axial direction and the radial direction.

The second bearing 500 may include a first frame 510 welded onto the inner circumferential surface of the hermetic case 100 above the stator 210, and a second frame 520 coupled to the frame 510 so as to be rotatably coupled to the crank shaft 230.

The frame 510 may be formed in an annular shape, and have fixing protrusions 511 protruding from an outer circumferential surface thereof by predetermined lengths to be welded onto the case main body 110. The fixing protrusions 511 may have an approximately 120° interval from one another along a circumferential direction.

The second frame 520 may include support protrusions 521 with an approximately 120° interval from one another so as to be supported at three points of the first frame 510. A bearing protrusion 522 may downwardly protrude from the center of the housing 520, such that an upper end of the crank shaft 230 can be inserted therein to be supported. A bearing bush 530 may be coupled to the bearing protrusion 522.

An unexplained reference numeral 250 denotes an oil feeder.

The rotary compressor having such configuration will operate as follows.

That is, when power is applied to the stator 210 of the motor 200 to rotate the rotor 220, the crank shaft 230 rotates with both ends thereof being supported by the first bearing 400 and the second bearing 500. The crank shaft 230 thus transfers a rotational force of the motor 200 to the compression part 300. The rolling piston 320 in the compression part 300 then eccentrically rotates in the compression space. Accordingly, the vane 330 forms a compression space together with the rolling piston 320 to compress a refrigerant. The compressed refrigerant is then discharged into the inner space 101 of the hermetic case 100.

Here, the crank shaft 230 fast rotates such that the oil feeder 250 located below the crank shaft 230 pumps up oil contained in an oil storage of the hermetic case 100. The oil is then sucked up via the oil passage 233 of the crank shaft 230 to lubricate each bearing surface.

However, the second bearing 500 is implemented as the bush bearing, but the bush bearing has a lubricant layer made of resin, such as Teflon, inside a porous bronze sintered layer, which may cause the lubricant layer to be as thin as about 20 μm. Accordingly, upon rotation of the crank shaft 230, the lubricant layer may be fast worn away, and thereby a metallic bronze sintered layer may be appeared, thereby possibly causing abrasion against the crank shaft 230. Hence, this specification purposes to delay abrasion of the lubricant layer by increasing the thickness of the lubricant layer.

Figure 2:
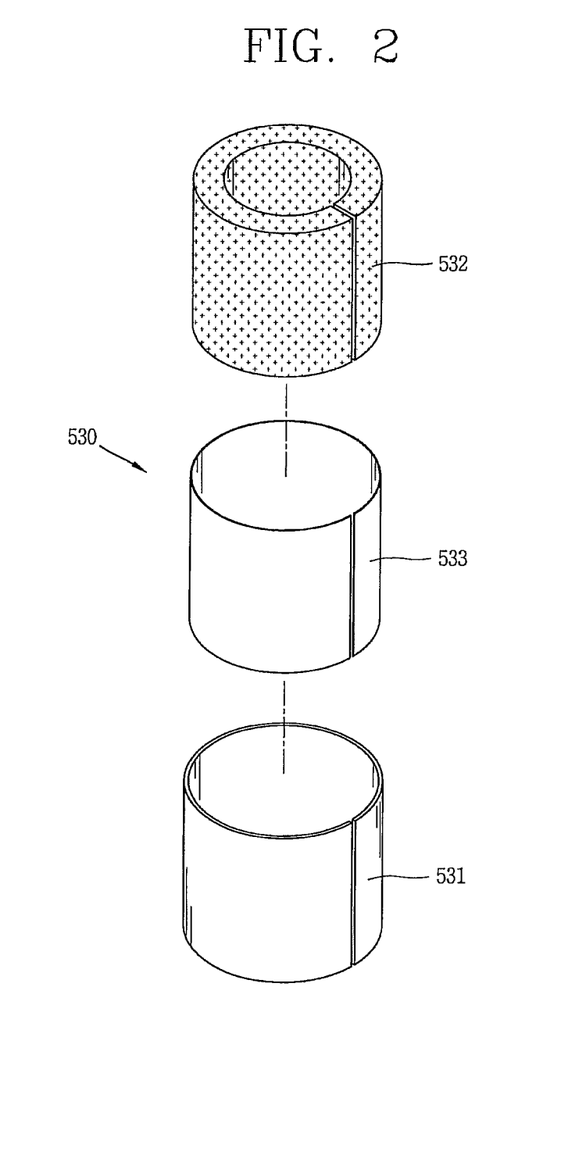
FIG. 2 is a disassembled perspective view showing an exemplary embodiment of a bush bearing.
Figure 3:
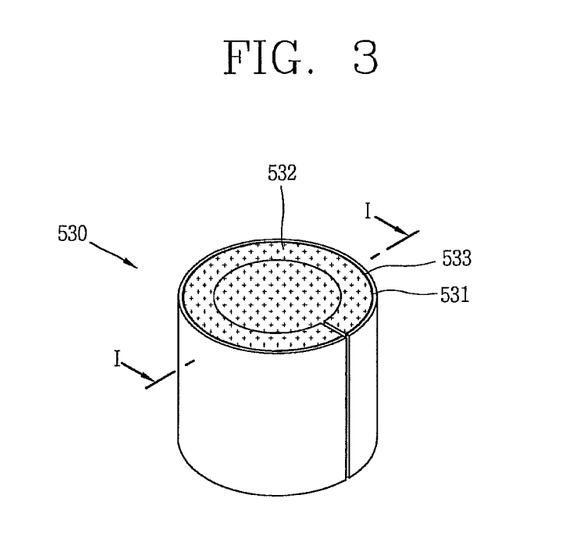
FIG. 3 is an assembled perspective view of the bush bearing shown in FIG. 2.
Figure 4:
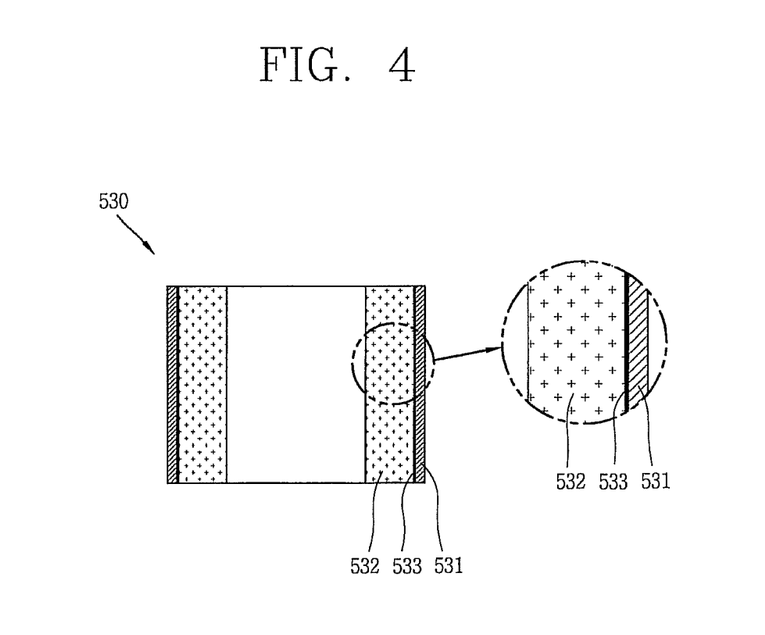
FIG. 4 is an assembled sectional view of the bush bearing shown in FIG. 3.

FIG. 2 is a disassembled perspective view showing an example of a bush bearing, FIG. 3 is an assembled perspective view of the bush bearing shown in FIG. 2, and FIG. 4 is an assembled sectional view of the bush bearing shown in FIG. 3.

As shown in FIGS. 2 to 4, the bush bearing 530 may be configured that a lubricant member 532, such as Teflon, is adhered into a housing 531, which is fixedly inserted in the bearing protrusion 522, by virtue of an adhesive film 533 as an adhesive member.

The housing 531 may be formed using a cold rolled carbon steel sheet having predetermined rigidity and thickness by rolling it in an arcuate shape, and the lubricant member 532 may have the same arcuate section as that of the housing 531. The thickness of the lubricant member 532 may increase much thicker than that of the related art one. For example, if the related art lubricant member is approximately 20 μm thick, the lubricant member 532 of this specification may be approximately 200 μm thick by increasing as much as the thickness of a bronze sintered layer excluded. Here, the adhesive film 533 may form an extremely thin layer.

A process of fabricating the bush bearing will be explained hereinafter.

Figure 5:
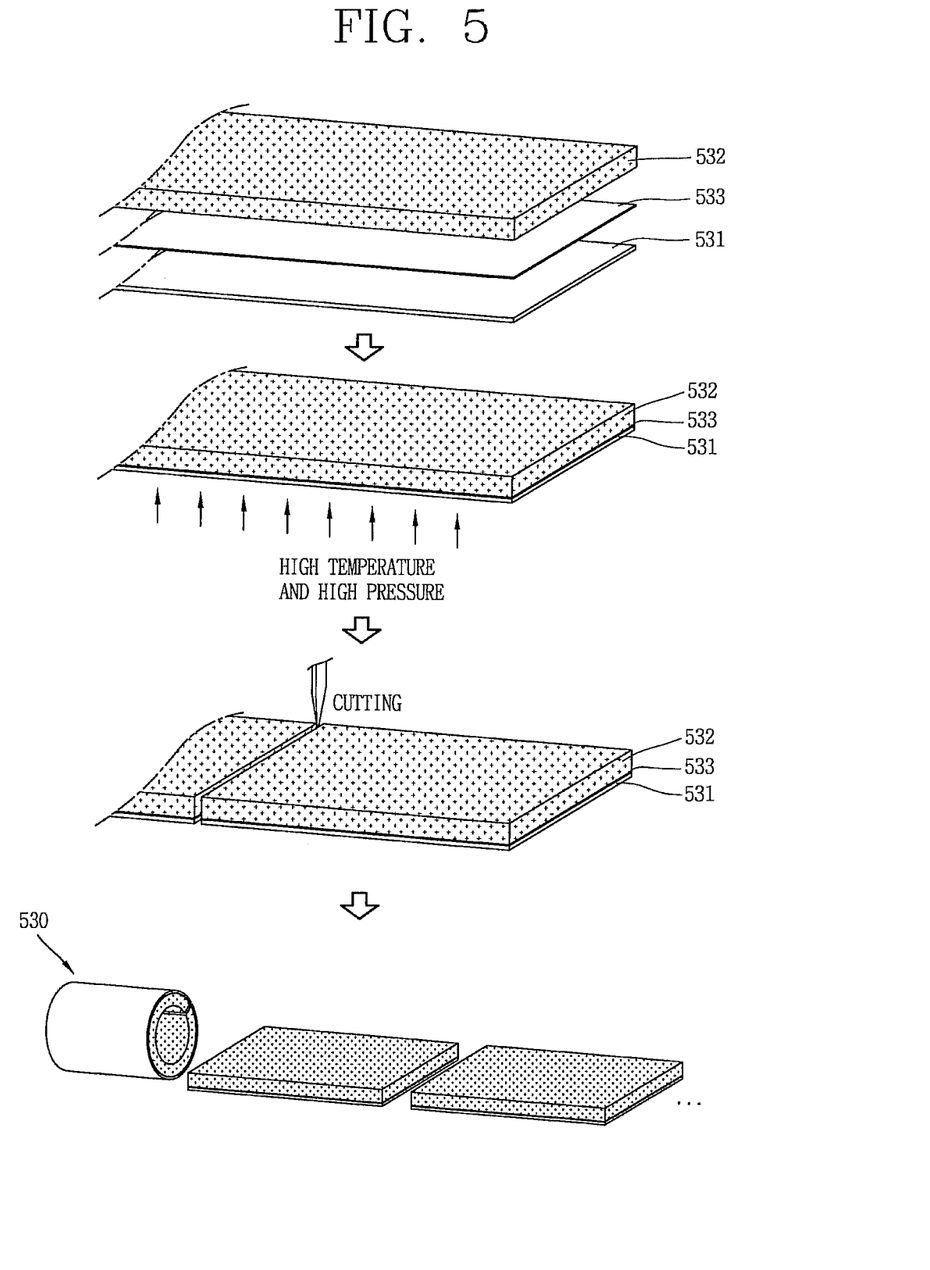
FIG. 5 is a perspective view showing a process of fabricating the bush bearing shown in FIG. 2.

As shown in FIG. 5, the adhesive film 533 having a plate shape may be coated on the housing (steel sheet) 531 in a flat plate shape. A resin material (hereinafter, described with the same number as the lubricant member 532) in a plate shape, which may act as the lubricant member 532, may be laid on the adhesive film 533.

High temperature and high pressure may then be applied to the steel sheet 531 to melt the adhesive film 533, thereby allowing adhesion of the resin material 532 onto the steel sheet 531.

The resin material-adhered steel sheet 531 may then be rolled and cut, or cut into a particular size to be rolled into a cylindrical shape as shown in the drawing.

Hereinafter, description will be given of an operational effect of the bush bearing having such structure.

That is, as the lubricant member 532 of the bush bearing 530 is adhered onto the housing 531 to be coupled thereto, the lubricant member 532 can be approximately 10 times thicker than that of the related art one. Consequently, the bush bearing 530 can be more resistant to abrasion. Also, upon applying the bush bearing to a compressor, abrasion of the crank shaft 230 or the bush bearing 530 can be reduced. Such abrasion levels have been tested and thusly-obtained results are shown in FIGS. 6 to 9.

Figure 6:
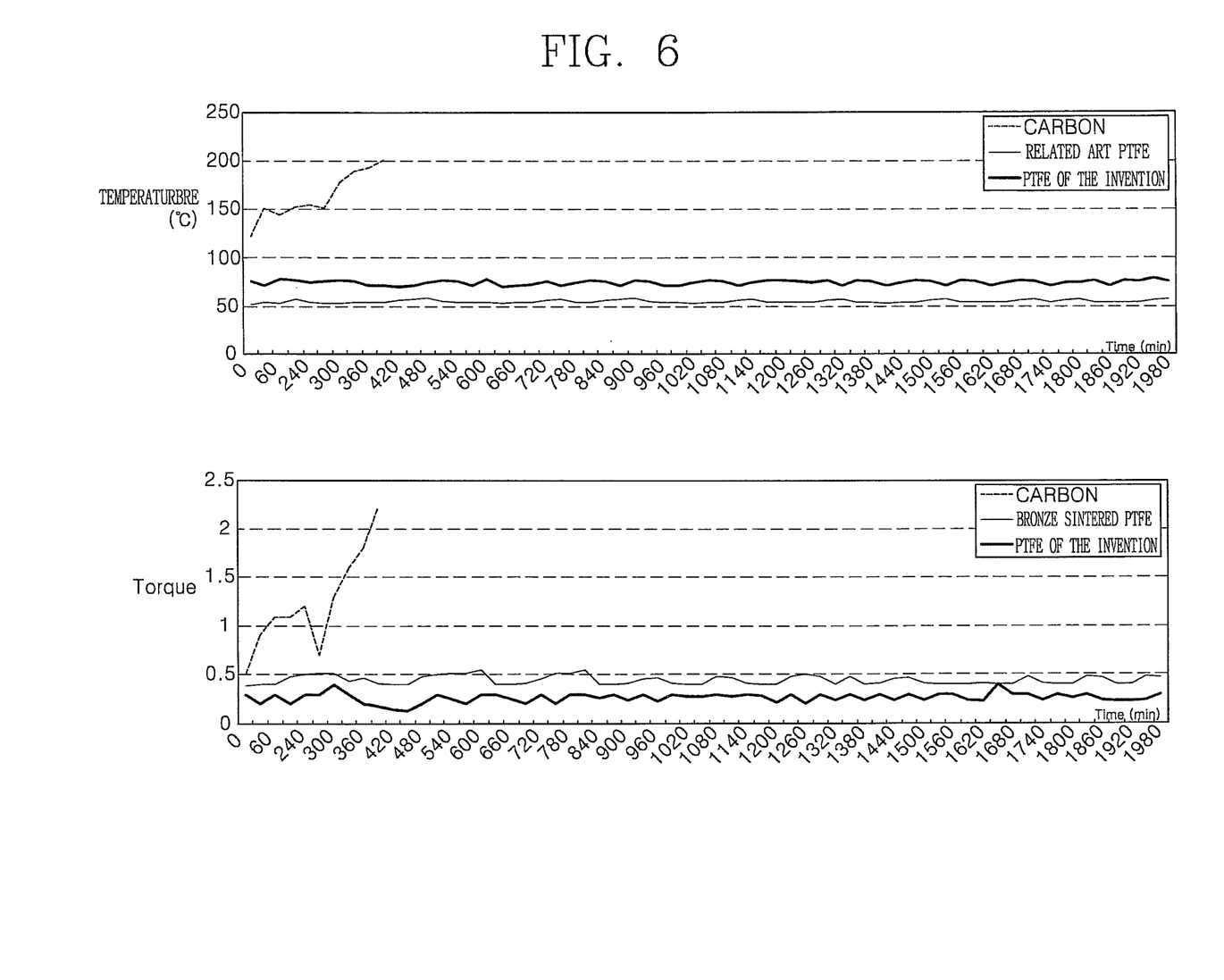
FIG. 6 is a graph showing results of abrasion resistance test in an oil-fed state.
Figure 7:
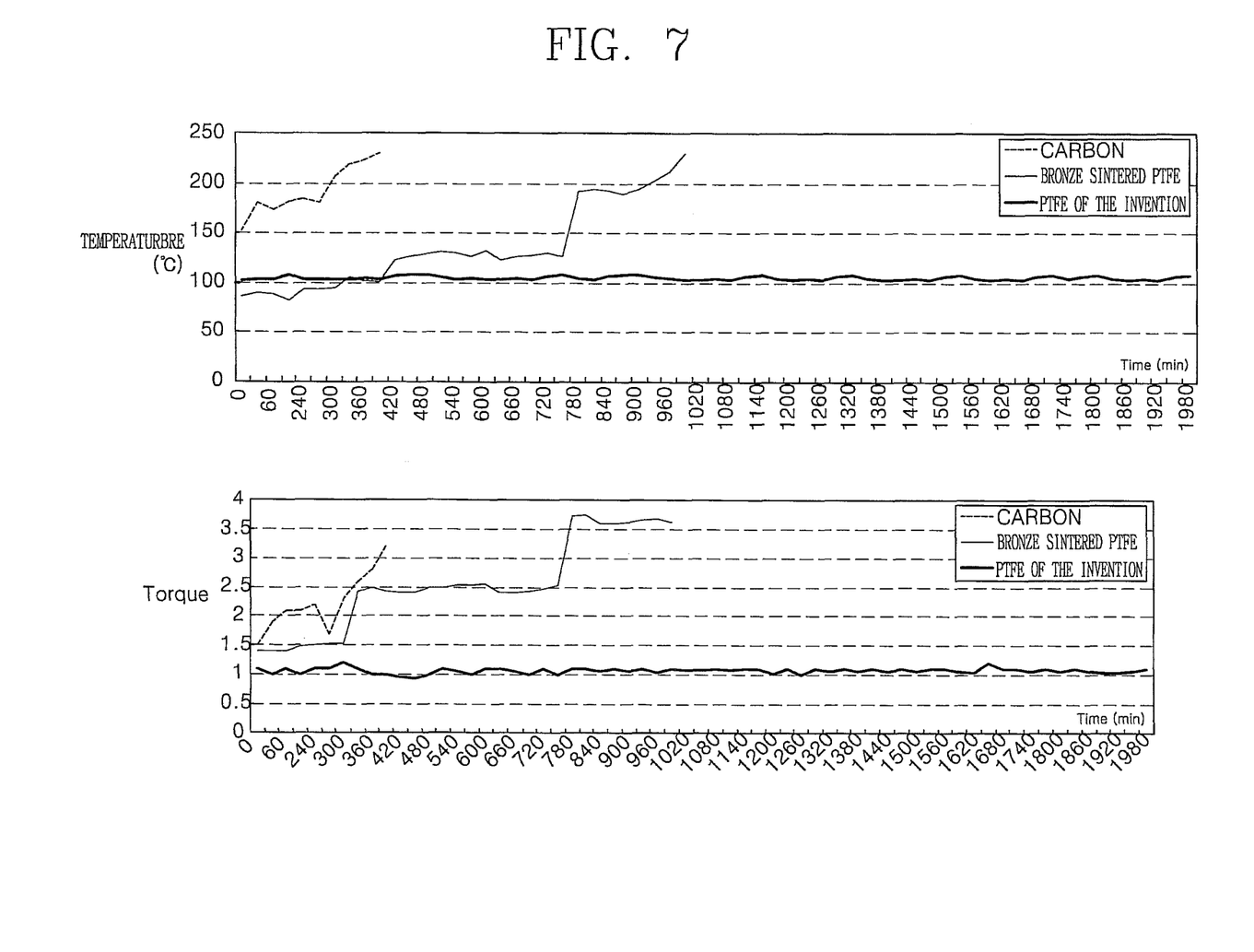
FIG. 7 is a graph showing results of abrasion resistance test in an oilless state.

FIG. 6 shows the results of abrasion resistance test in an oil-fed state, and FIG. 7 shows the results of abrasion resistance test in an oilless state. Referring to those graphs, it can be noticed that temperature and torque between the bush bearing 530 and the crank shaft 530 during operation thereof are considerably lower than those of the carbon-based bush bearing or the Teflon-based bush bearing having the bronze sintered layer according to the related art. Hence, it can be understood that the bush bearing of this specification has an improved abrasion resistance as compared with the related art bush bearing.

Figure 8:
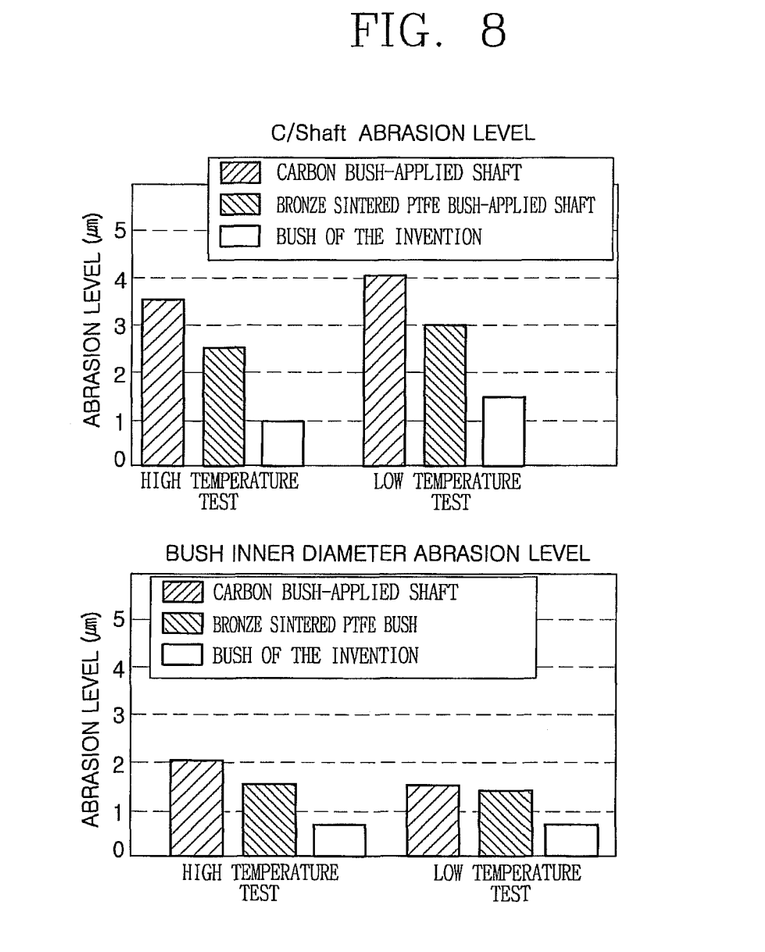
FIG. 8 is a graph showing testing results of abrasion levels of the crank shaft and the bush bearing in case where the bush bearing is applied as a second bearing of the rotary compressor.

FIG. 8 shows testing results of abrasion levels of the crank shaft and the bush bearing in case where the bush bearing is applied as a second bearing of the rotary compressor. As shown in FIG. 8, it can be observed that the abrasion levels of the crank shaft and the bush bearing are considerably low as compared with that of the related art carbon-based bush bearing or Teflon-based bush bearing having the bronze sintered layer.

Figure 9:
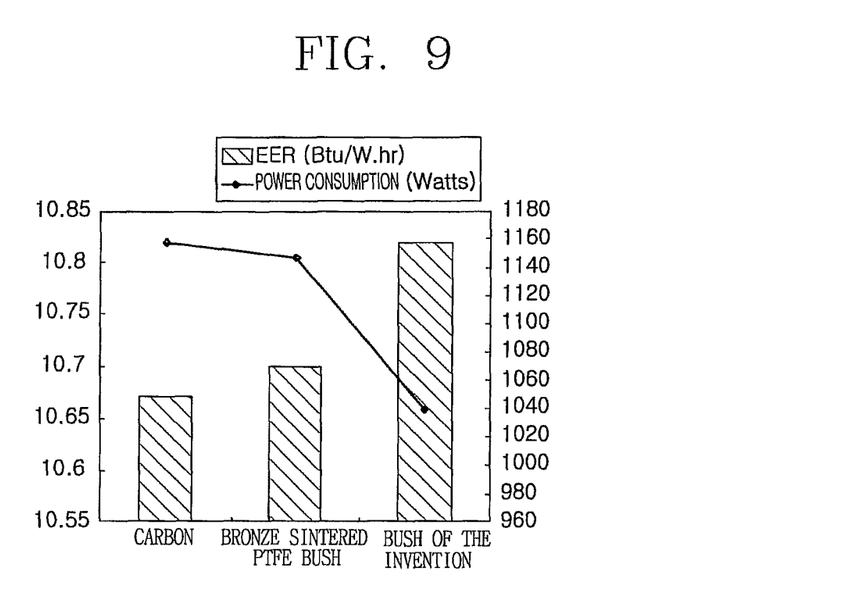
FIG. 9 is a graph showing results of performance variation of the rotary compressor in case where the bush bearing is applied as a second bearing of the rotary compressor.

FIG. 9 is a graph showing results of performance variation of the rotary compressor in case where the bush bearing in case where the bush bearing is applied as a second bearing of the rotary compressor.

As shown in FIG. 9, it can be observed that performance and power consumption of the rotary compressor having the bush bearing according to this specification are remarkably improved as compared with those of the rotary compressor having the related art bush bearing.

Hereinafter, description will be given of other embodiments of the bush bearing.

Figure 10:
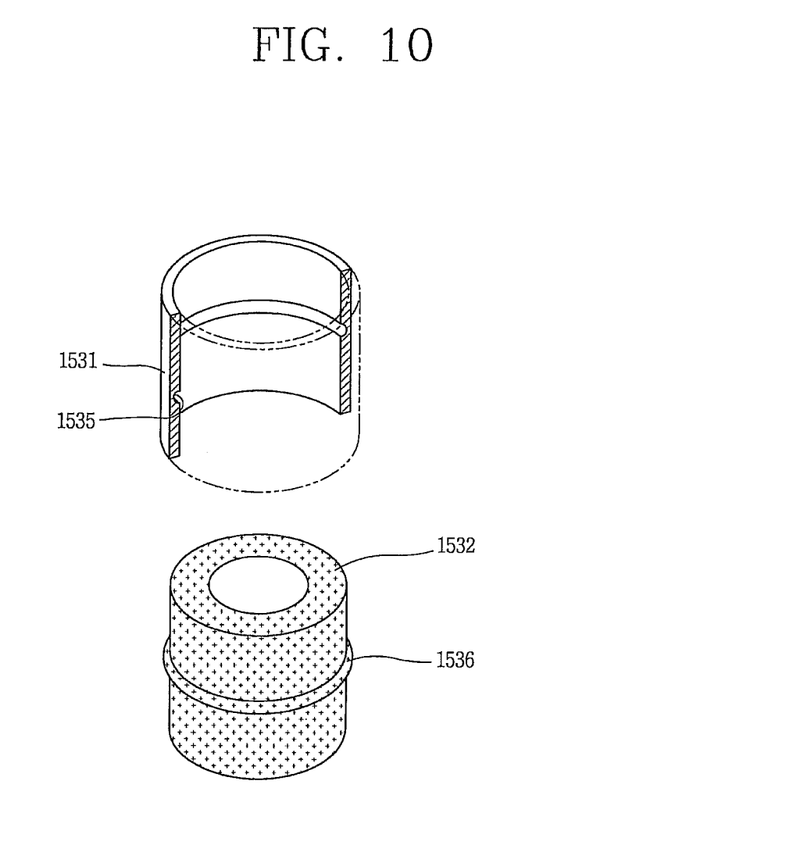
FIGS. 10 and 11 are disassembled perspective views respectively showing another exemplary embodiments of the bush bearing shown in FIG. 1.

That is, the foregoing embodiment exemplarily illustrates that the housing and the lubricant member are coupled by virtue of the adhesive member. However, this exemplary embodiment illustrates that a housing 1531 is formed in a cylindrical shape, and a lubricant member 1532 also having a cylindrical shape is press-fitted into the housing 1531.

Here, a fixing groove 1535 may be formed at an inner circumferential surface of the housing 1531 and a fixing protrusion 1536 may be formed at an outer circumferential surface of the lubricant member 1532 to be engaged with the fixing groove 1535. Accordingly, the fixing protrusion 1536 of the lubricant member 1532 can be inserted in the fixing groove 1535 of the housing 1531, thereby improving an adhesion force therebetween. Alternatively, the fixing protrusion 1536 may be formed at the inner circumferential surface of the housing 1531, and the fixing groove 1536 may be formed at the outer circumferential surface of the lubricant member 1532.

Also, instead of previously forming the fixing groove 1535 and the fixing protrusion 1536, in a state that the lubricant member 1532 is press-fitted into the housing 1531, at least one portion on the outer circumferential surface of the housing 1531 may be pressed in a radial direction such that the housing 1531 can be dented toward the lubricant member 1532, thereby forming the fixing groove and the fixing protrusion.

Figure 11:
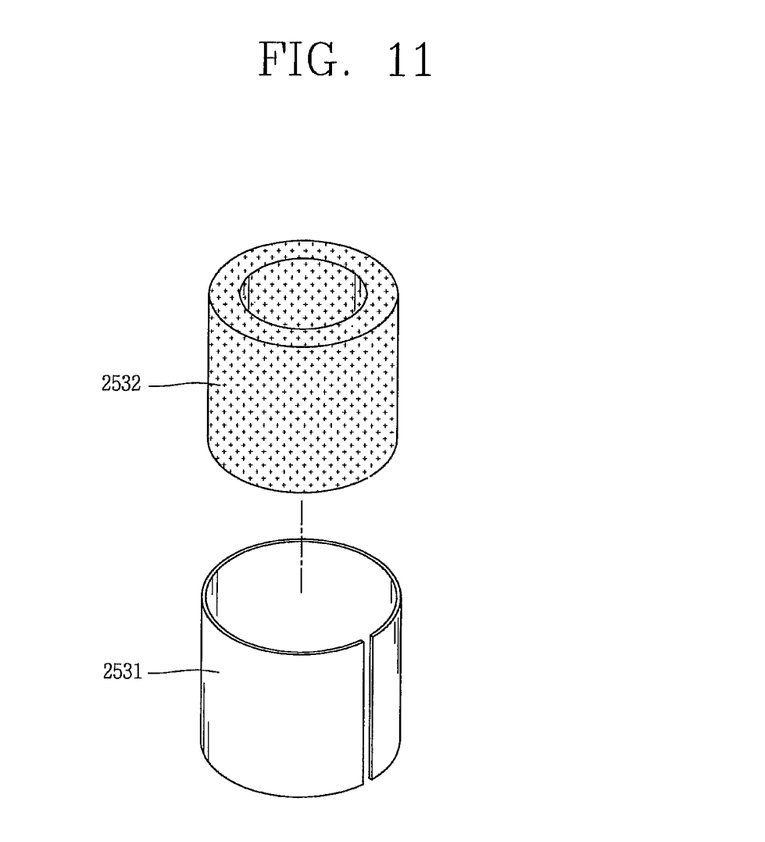

In addition, as shown in FIG. 11, a housing 2531 may be formed with an arcuate section and a lubricant member 2532 may be formed with a cylindrical section. Then, the lubricant member 2532 can be press-fitted into the housing 2531. Here, the housing 2531 may act as a snap ring having elasticity so as to further improve an adhesive force with the lubricant member 2532. Alternatively, the lubricant member may have the arcuate sectional shape and the housing may have the cylindrical sectional shape. Here, an outer diameter of the lubricant member may be slightly greater than an inner diameter of the housing such that the lubricant member can be astringed and then relaxed in the housing, thereby improving the adhesion force between the housing and the lubricant member.

The basic operational effects of the bush bearings according to the above exemplary embodiments are similar or the same as the foregoing embodiment, and thus detailed description thereof will not be repeated.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A hermetic compressor comprising:
a hermetic case;
a motor including a stator attached to an inner space of the hermetic case, a rotor rotatably provided with respect to the stator, and a crank shaft coupled to the rotor;
a compression part coupled to the crank shaft to compress a refrigerant based on driving force of the motor;
a first bearing to support a first portion of the crank shaft; and
a second bearing to support a second portion of the crank shaft,
wherein the second bearing includes:
a bush bearing,
a first frame formed in an annular shape, and the first frame having fixing protrusions protruding from an outer circumferential surface thereof by lengths to be welded onto an inner circumferential surface of the hermetic case, and
a second frame detachably coupled to the first frame and coupled with the bush bearing, the second frame includes a plurality of support protrusions supported by the first frame and a bearing protrusion that protrudes from the support protrusions toward the motor.

2. The compressor of claim 1, wherein the bush bearing is coupled to the bearing protrusion such that the bush bearing is provided between the crank shaft and the bearing protrusion.

3. A hermetic compressor comprising:
a hermetic case;
a stator attached to an inner space of the hermetic case;
a rotor rotatably provided with respect to the stator;
a crank shaft coupled to the rotor;
a compression part coupled to the crank shaft to compress a refrigerant;
a first bearing to support a first portion of the crank shaft; and
a second bearing attached to the hermetic case to support a second portion of the crank shaft,
wherein the second bearing includes:
a bush bearing,
a first frame formed in an annular shape, and the first frame having fixing protrusions protruding from an outer circumferential surface thereof by lengths to be welded onto an inner circumferential surface of the hermetic case, and
a second frame detachably coupled to the first frame and coupled with the bush bearing, the second frame includes a plurality of support protrusions supported by the first frame and a bearing protrusion that protrudes from the support protrusions toward the rotor, and
wherein the bush bearing includes:
a housing, and
a lubricant member coupled to an inner surface of the housing and that slidably surrounds a portion of the crank shaft, the lubricant member being more flexible than the crank shaft,
wherein both the housing and the lubricant member have an annular section,
wherein a protrusion is formed on an outer surface of the lubricant member or the inner surface of the housing, and a groove is formed on the inner surface of the housing or the outer surface of the lubricant member such that the protrusion is provided within the groove, and
wherein the lubricant member is press-fitted into the housing.

4. The compressor of claim 3, wherein the lubricant member includes a resin.

5. The compressor of claim 3, further comprising an adhesive member between the housing and the lubricant member to provide adhesion between the housing and the lubricant member.

6. The compressor of claim 5, wherein the lubricant member is thicker than the adhesive member.

7. The compressor of claim 5, wherein the lubricant member includes the protrusion on an outer surface of the lubricant member, and the housing includes the groove on the inner surface of the housing such that the protrusion is provided with the groove.

8. The compressor of claim 3, wherein the housing includes the protrusion on the inner surface of the housing, and the lubricant member includes the groove on the outer surface of the lubricant member such that the protrusion is provided within the groove.

9. The compressor of claim 3, wherein the bush bearing is coupled to the bearing protrusion such that the bush bearing is provided between the crank shaft and the bearing protrusion.

10. The compressor of claim 1, wherein the bush bearing includes:
a housing;
a lubricant member having a bearing surface to receive a rotating element; and an adhesive member between the housing and the lubricant member to provide adhesion between the housing and the lubricant member;

wherein the housing and the lubricant member are made of different materials, wherein the lubricant member is thicker than the housing, and wherein the housing has an arcuate section and the lubricant member has an arcuate or a cylindrical section.

11. The compressor of claim 10, wherein the lubricant member includes a protrusion on an outer surface of the lubricant member, and the housing includes a groove at the inner surface of the housing such that the protrusion is provided within the groove.

12. The compressor of claim 10, wherein the housing includes a protrusion on the inner surface of the housing, and the lubricant member includes a groove on an outer surface of the lubricant member such that the protrusion is provided within the groove.

* * * * *